(12) United States Patent
Chou et al.

(10) Patent No.: US 8,189,097 B2
(45) Date of Patent: May 29, 2012

(54) ADJUSTING METHOD OF FLASH INTENSITY

(75) Inventors: Chan-Min Chou, Taipei County (TW); Chung-Pin Lu, Taipei County (TW)

(73) Assignee: Altek Corporation, Hsinchu (TW)

(*) Notice: Subject to any disclaimer, the term of this patent is extended or adjusted under 35 U.S.C. 154(b) by 363 days.

(21) Appl. No.: 12/507,667

(22) Filed: Jul. 22, 2009

(65) Prior Publication Data

US 2010/0165178 A1    Jul. 1, 2010

(30) Foreign Application Priority Data

Dec. 31, 2008  (TW) .............................. 97151802 A (51) Int. Cl.
*H04N 5/222*    (2006.01)
*H04N 5/238*    (2006.01)

(52) U.S. Cl. ........................ 348/371; 348/364

(58) Field of Classification Search .................. 348/362, 348/345, 371, 255, 257, 226.1, 229.1, 222.1, 348/221.1, 227.1, 228.1; 396/172–181, 157, 396/108

See application file for complete search history.

(56) References Cited

U.S. PATENT DOCUMENTS

| | | | | |
|---|---|---|---|---|
| 5,987,261 A * | 11/1999 | Sugahara et al. | ............... | 396/61 |
| 6,560,412 B2 * | 5/2003 | Iwasaki | ......................... | 396/157 |
| 6,714,734 B2 * | 3/2004 | Muramatsu | .................... | 396/157 |
| 7,675,569 B2 * | 3/2010 | Maeda | .......................... | 348/371 |
| 7,676,148 B2 * | 3/2010 | Hosoi | ............................ | 396/157 |
| 7,859,573 B2 * | 12/2010 | Subbotin et al. | ........... | 348/221.1 |

* cited by examiner

*Primary Examiner* — David Ometz
*Assistant Examiner* — Ahmed A Berhan
(74) *Attorney, Agent, or Firm* — Morris Manning & Martin LLP; Tim Tingkang Xia, Esq.

(57) ABSTRACT

An adjusting method of flash intensity is applied in an image capture apparatus with a flash lamp, where two pre-flash images corresponding the object are retrieved under two different pre-flash lights, respectively, and then a flash intensity of main-flash light is calculated according to one of the retrieved pre-flash images, so as to retrieve a main-flash image corresponding the object under the main-flash light with the calculated main-flash light.

16 Claims, 5 Drawing Sheets

ADJUSTING METHOD OF FLASH INTENSITY

CROSS-REFERENCE TO RELATED APPLICATIONS

This non-provisional application claims priority under 35 U.S.C. §119(a) on Patent Application No(s). 097151802 filed in Taiwan, R.O.C. on Dec. 31, 2008 the entire contents of which are hereby incorporated by reference.

BACKGROUND

1. Field of the Invention

The present invention relates to a method for adjusting an image pickup luminance, and in particular, to an adjusting method of flash intensity for a flash lamp.

2. Related Art

A flash lamp is disposed in a digital image capture apparatus to compensate for an insufficient luminance for an object to be shot during shooting. In other words, when the object to be shot is in an environment with a low luminance, the digital image capture apparatus triggers the flash lamp during shooting, so as to enable the luminance of a shot digital image corresponding to the object to achieve a desirable value through a strong flash light emitted by the flash lamp.

Generally, the digital image capture apparatus performs a pre-flash to emit a pre-flash light before emitting a main-flash light. The digital image capture apparatus evaluates a flash intensity (also referred to as an output intensity) of the main-flash light according to the luminance of the image corresponding to the object shot under the pre-flash light.

Moreover, a shooting mode of the digital image capture apparatus is substantially classified as a normal mode (e.g., a portrait mode, a landscape mode, etc.) and a macro mode. The digital image capture apparatus uses pre-flash lights with different flash intensities to evaluate the flash intensity of the main-flash light in different shoot modes.

In the normal mode, the digital image capture apparatus is far away from the object to be shot, so the digital image capture apparatus uses a pre-flash light with a greater flash intensity. In the macro mode, the digital image capture apparatus is close to the object to be shot, so the digital image capture apparatus generally uses a pre-flash light with a smaller flash intensity.

When the digital image capture apparatus is close to the object to be shot, if the normal mode is set, the image corresponding to the object and retrieved under the main-flash light has an over exposure since the excessive high flash intensity of the pre-flash light causes the main-flash light to have an excessive high flash intensity.

When the digital image capture apparatus is far away from the object to be shot, if a macro mode is set, the image corresponding to the object and retrieved under the main-flash light has an insufficient exposure since the excessive low flash intensity of the pre-flash light causes the main-flash light to have an excessive low flash intensity.

However, a user may not always switch to a corresponding shoot mode as the actual circumstance requires. If a pre-flash is carried out by a pre-flash light with an incorrect flash intensity, the flash intensity of the main-flash light evaluated by the digital image capture apparatus may become inaccurate accordingly. As such, the digital image capture apparatus tends to shoot an over bright or over dark digital image.

SUMMARY OF THE INVENTION

In view of the above problems, the present invention is directed to an adjusting method of flash intensity, which is suitable for solving the problem about shooting an over bright or over dark digital image due to an incorrect evaluation of a flash intensity of a flash lamp.

Thus, the present invention provides an adjusting method of flash intensity, which is applied in an image capture apparatus with a flash lamp. The adjusting method includes the following steps: emitting a first pre-flash light by the flash lamp when the image capture apparatus photographs an object; retrieving a first pre-flash image corresponding the object under the first pre-flash light; emitting a second pre-flash light by the flash lamp when the image capture apparatus shoots the object; retrieving a second pre-flash image corresponding the object under the second pre-flash light; selecting one of the first pre-flash image and the second pre-flash image to be a determined pre-flash image according to a luminance of the first pre-flash image and that of the second pre-flash image; calculating a flash intensity of a main-flash light by utilizing the determined pre-flash image; emitting a main-flash light of a main-flash light with the calculated flash intensity by the flash lamp; retrieving a main-flash image corresponding the object under the main-flash light; and outputting the retrieved main-flash image. A flash intensity of the second pre-flash light is different from that of the first pre-flash light.

The step of selecting one of the first pre-flash image and the second pre-flash image to be a determined pre-flash image according to a luminance of the first pre-flash image and that of the second pre-flash image can include: obtaining a plurality of pixel values of the first pre-flash image; obtaining a plurality of pixel values of the second pre-flash image; comparing the plurality of pixel values of the first pre-flash image with a preset threshold value respectively, and accumulating a first number; comparing the plurality of pixel values of the second pre-flash image with the preset threshold value respectively, and accumulating a second number; comparing the first number with the second number to obtain a comparison result; and selecting one of the first pre-flash image and the second pre-flash image to be the determined pre-flash image according to the obtained comparison result. The first number is the number of pixel values that are greater than the preset threshold value among the plurality of pixel values of the first pre-flash image, and the second number is the number of pixel values that are greater than the preset threshold value among the plurality of pixel values of the second pre-flash image.

The step of comparing the first number with the second number can include selecting the greater number from the first number and the second number, so as to take a pre-flash image corresponding to the greater number of the first pre-flash image and the second pre-flash image as the determined pre-flash image.

Furthermore, when the flash intensity of the first pre-flash light is greater than that of the second pre-flash light and the first number is equal to the second number, the first pre-flash image is selected to be the determined pre-flash image.

Moreover, when the flash intensity of the first pre-flash light is greater than that of the second pre-flash light, the step of selecting one of the first pre-flash image and the second pre-flash image to be a determined pre-flash image according to a luminance of the first pre-flash image and that of the second pre-flash image can include: averaging luminance values of the first pre-flash image to get a first luminance value of the first pre-flash image; comparing the first luminance value with a luminance standard to get a comparison result; and selecting one of the first pre-flash image and the second pre-flash image according to the comparison result. The first luminance value is an average of luminance values of the first pre-flash image.

The luminance standard can be a luminance value of an overexposure image, a luminance value of an insufficient-exposure image or a luminance in a range of smaller than the luminance value of the overexposure image and greater than the luminance value of the insufficient-exposure image.

When the luminance standard includes the luminance value of an overexposure image and the first luminance is greater than the luminance value of the overexposure image, the second pre-flash image is selected to be the determined pre-flash image. Furthermore, when the luminance standard includes the luminance value of an overexposure image and the first luminance is equal to or smaller than the luminance value of the overexposure image, the first pre-flash image is selected to be the determined pre-flash image.

The step of outputting the retrieved main-flash image may include: converting an image format of the retrieved main-flash image; and outputting the main-flash image with the converted image format.

The present invention provides an adjusting method of flash intensity, applied in an image capture apparatus with a flash lamp. The adjusting method includes: performing an automatic focusing before the image capture apparatus shoots an object; retrieving a focused image corresponding to the object after the automatic focusing is accomplished; emitting a first pre-flash light by the flash lamp; retrieving a first pre-flash image corresponding to the object under the first pre-flash light; emitting a second pre-flash light by the flash lamp; retrieving a second pre-flash image corresponding to the object under the second pre-flash light; calculating a first luminance value of the first pre-flash image; calculating a second luminance value of the second pre-flash image; calculating a third luminance value of the focused image; comparing the first luminance value with the third luminance value to obtain a first difference value; comparing the second luminance value with the third luminance value to get a second difference value; comparing the first difference value with the second difference value to get a comparison result; selecting one of the first pre-flash image and the second pre-flash image to be a determined pre-flash image according to the comparison result; calculating a flash intensity by utilizing the selected pre-flash image; emitting a main-flash light with the calculated flash intensity; retrieving a main-flash image under the main-flash light; and outputting the retrieved main-flash image. A flash intensity of the second pre-flash light is different from that of the first pre-flash light. The first luminance value is an average of luminance values of the first pre-flash image, the second luminance value is an average of luminance values of the second pre-flash image, and the third luminance value is an average of luminance values of the focused image.

Furthermore, when the first difference value is greater than the second difference value, the second pre-flash image is selected to be the determined pre-flash image; and wherein when the first difference value is equal to or smaller than the second difference value, the first pre-flash image is selected to be the determined pre-flash image.

Finally, the step of outputting the retrieved main-flash image can include converting an image format of the retrieved main-flash image, and outputting the main-flash image with the converted image format.

The adjusting method of flash intensity provided by the present invention, when being applied in a digital image capture apparatus, enables the digital image capture apparatus to produce a main-flash light with a proper flash intensity in any shooting mode, which thus reduces the luminance error in the digital image caused by a mistake made by a user when performing the settings.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The detailed features and advantages of the present invention described hereinafter are sufficient for those of ordinary skill in the art to appreciate the technical content of the present invention and implement the present invention accordingly, and from the content, claims, and figures disclosed in this specification, those of ordinary skill in the art can easily understand the objectives and advantages of the present invention.

The adjusting method of flash intensity according to the present invention is applied to a digital image capture apparatus with a flash lamp. The method of the present invention may be in-built in a storage device of the digital image capture apparatus through software or firmware program, and the in-built software or firmware program is then executed by a processor of the digital image capture apparatus to realize the adjusting method of flash intensity according to the present invention. Herein, the digital image capture apparatus may be a digital camera, a mobile phone with an image pickup function, or a personal digital assistant (PDA) with an image pickup function, but it is not limited herein.

In this application, two pre-flash lights with different flash intensities are used to retrieve two pre-flash images, and then one of the two retrieved pre-flash images is selected to evaluate a flash intensity of a main-flash light, so as to determine a flash intensity (e.g., energy and/or time, etc.) of the desired main-flash light when shooting an object.

Figure 1:
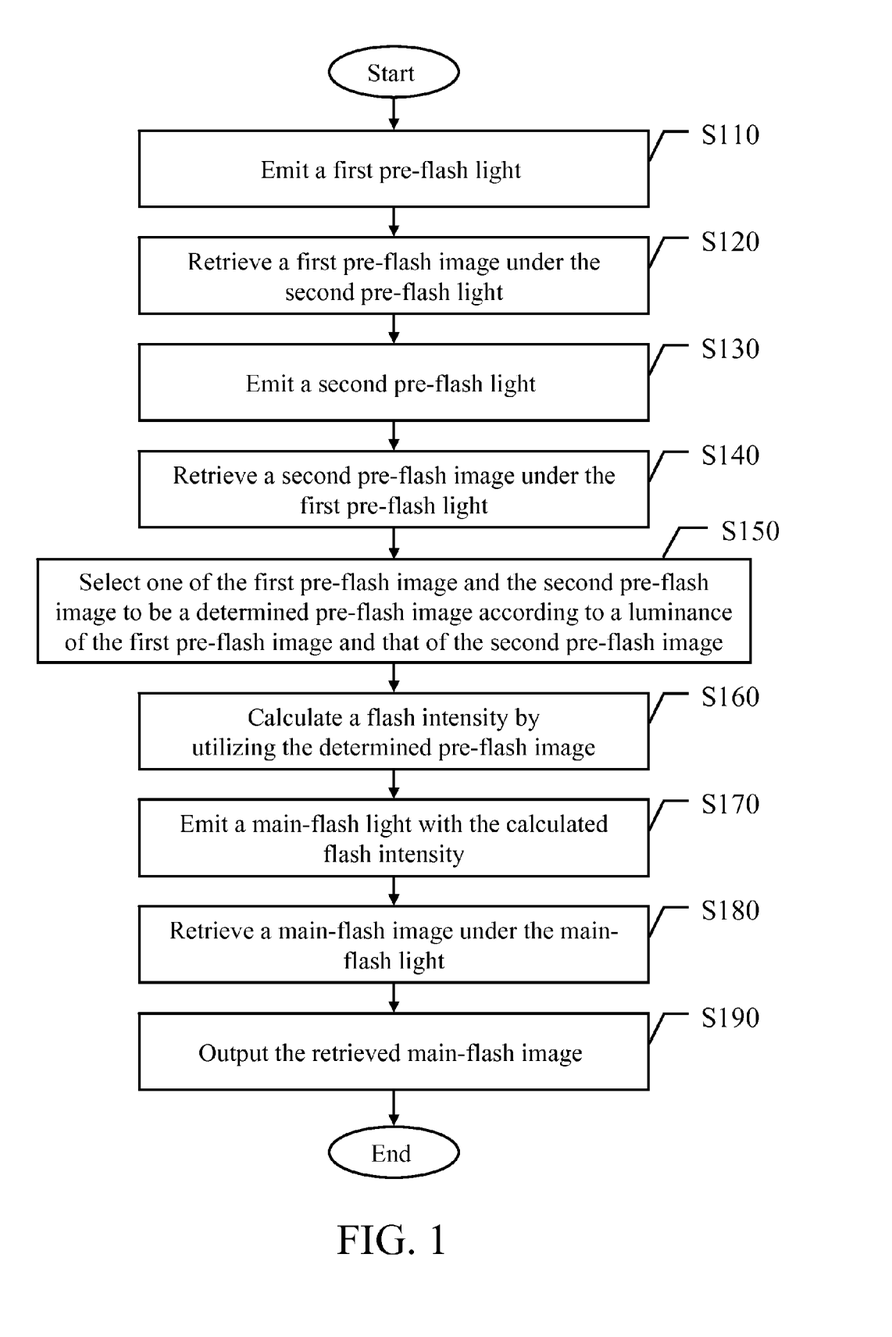
FIG. 1 is a schematic view of an adjusting method of flash intensity according to an embodiment of the present invention.

FIG. 1 is a schematic view of an adjusting method of flash intensity according to an embodiment of the present invention.

When a flash lamp of the digital image capture apparatus is in an ON state and an object is being shot, the flash lamp of the digital image capture apparatus emits a first pre-flash light (Step S110), and under the first pre-flash light, a first pre-flash image corresponding to the shot object is retrieved (Step S120). Then, the flash lamp of the digital image capture apparatus emits a second pre-flash light (Step S130), and under the second pre-flash light, a second pre-flash image corresponding to the shot object is retrieved (Step S140). After the first pre-flash image and the second pre-flash image are retrieved, the digital image capture apparatus selects one of the first pre-flash image and the second pre-flash image to be a determined pre-flash image according to a luminance of the first pre-flash image and that of the second pre-flash image (Step S150), and calculates a flash intensity by utilizing the determined pre-flash image (i.e., the first pre-flash image or the second pre-flash image) (Step S160). Then, the flash lamp emits a main-flash light with the calculated flash intensity (Step S170), so as to shoot the shot object. At this time, the digital image capture apparatus retrieves a main-flash image corresponding to the shot object under the main-flash light (Step S180). Finally, the digital image capture apparatus displays the retrieved main-flash image on the display thereof (Step S190).

The flash intensity (also referred to as output intensity) of the second pre-flash light is different from that of the first pre-flash light. Herein, the flash intensity of the first pre-flash light may be greater than that of the second pre-flash light. In other words, the digital image capture apparatus may emit a pre-flash light with a higher flash intensity to retrieve a pre-flash image, and then emit a pre-flash light with a lower flash intensity to retrieve another pre-flash image. However, the digital image capture apparatus may also emit a pre-flash light with a lower flash intensity, and then emit another pre-flash light with a higher flash intensity, so as to retrieve the two pre-flash images successively.

Figure 2:
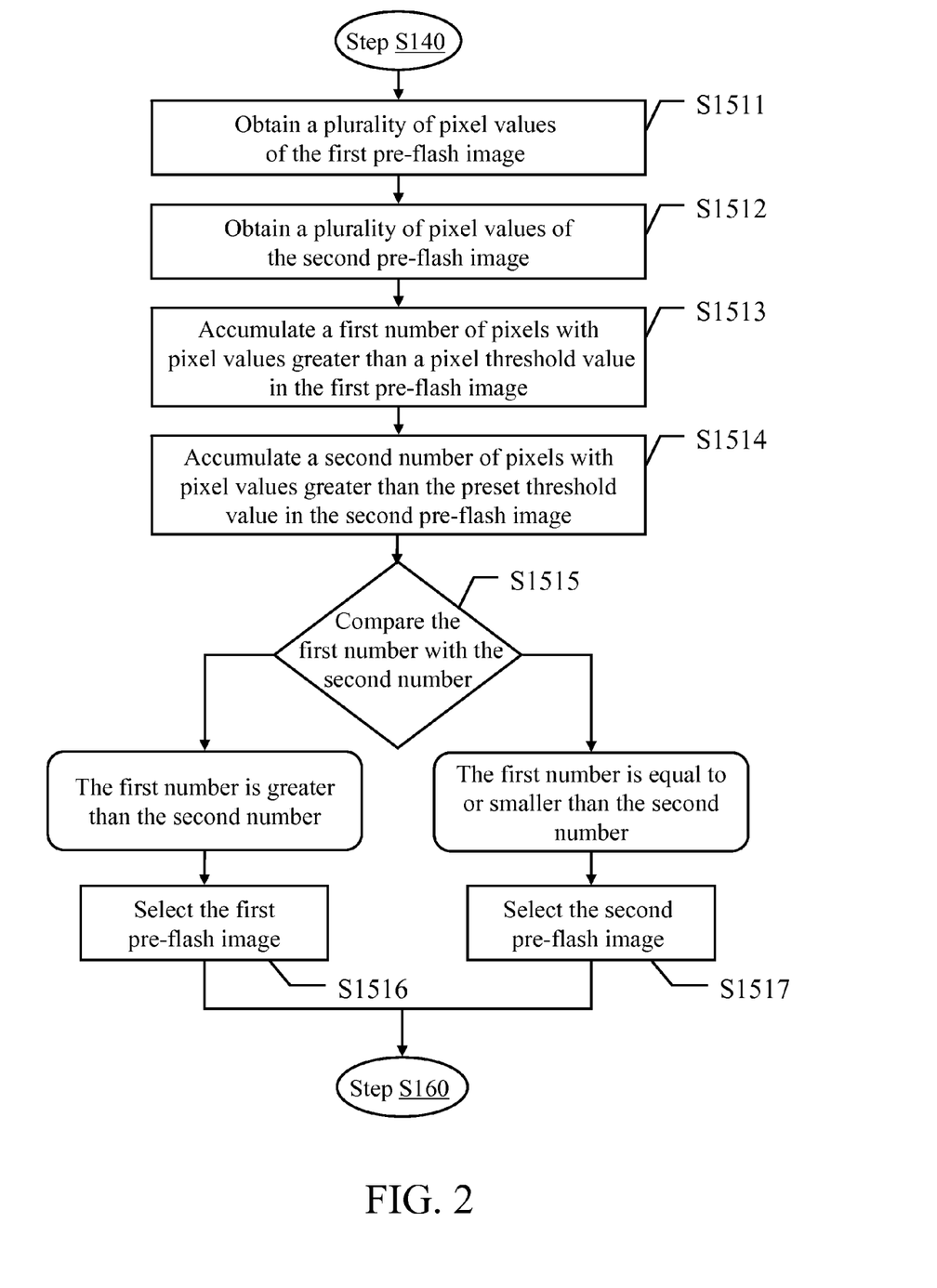
FIG. 2 is a flow chart of selecting one of a first pre-flash image and a second pre-flash image according to an embodiment of the present invention.

FIG. 2 is a flow chart of selecting one of a first pre-flash image and a second pre-flash image according to an embodiment of the present invention. Referring to FIG. 2, Step S150 may include the following implementation steps.

First, a plurality of pixel values of the first pre-flash image is obtained (Step S1511), and a plurality of pixel values of the second pre-flash image is obtained (Step S1512). Then, the pixel values of the first pre-flash image are compared with a preset threshold value respectively, and a number of pixels with pixel values greater than the preset threshold value in the first pre-flash image is accumulated (for the ease of description, the accumulated pixel number is referred to as a first number hereinafter) (Step S1513). Furthermore, the pixel values of the second pre-flash image are compared with the preset threshold value respectively, and a number of pixels with pixel values greater than the preset threshold value in the second pre-flash image is accumulated (for the ease of description, the accumulated pixel number is referred to as a second number hereinafter) (Step S1514). The first number is compared with the second number to obtain a comparison result (Step S1515), so as to select the first pre-flash image or the second pre-flash image according to the obtained comparison result between the first number and the second number, thereby evaluating the flash intensity of the main-flash light.

Furthermore, for the ease of illustration, it is assumed that the flash intensity of the first pre-flash light is greater than that of the second pre-flash light. In this case, the greater number from the first number and the second number is selected, so as to take a pre-flash image (i.e. the first pre-flash image or the second pre-flash image) corresponding to the greater number as the determined pre-flash image. That is, when the first number is greater than the second number, the first pre-flash image is selected as the determined pre-flash image (Step S1516), which serves as a reference for evaluating the flash intensity of the main-flash light. On the contrary, when the first number is equal to or smaller than the second number, the second pre-flash image is selected as the determined pre-flash image (Step S1517), which serves as a reference for evaluating the flash intensity of the main-flash light.

Moreover, the digital image capture apparatus may preset a preset threshold value, so as to be compared with the pixel value of each pixel in the first pre-flash image or the second pre-flash image when shooting the object.

Moreover, an average luminance of the pre-flash image may be further used to evaluate the flash intensity of the main-flash light. For the ease of illustration, it is assumed that the flash intensity of the first pre-flash light is greater than that of the second pre-flash light.

Figure 3:
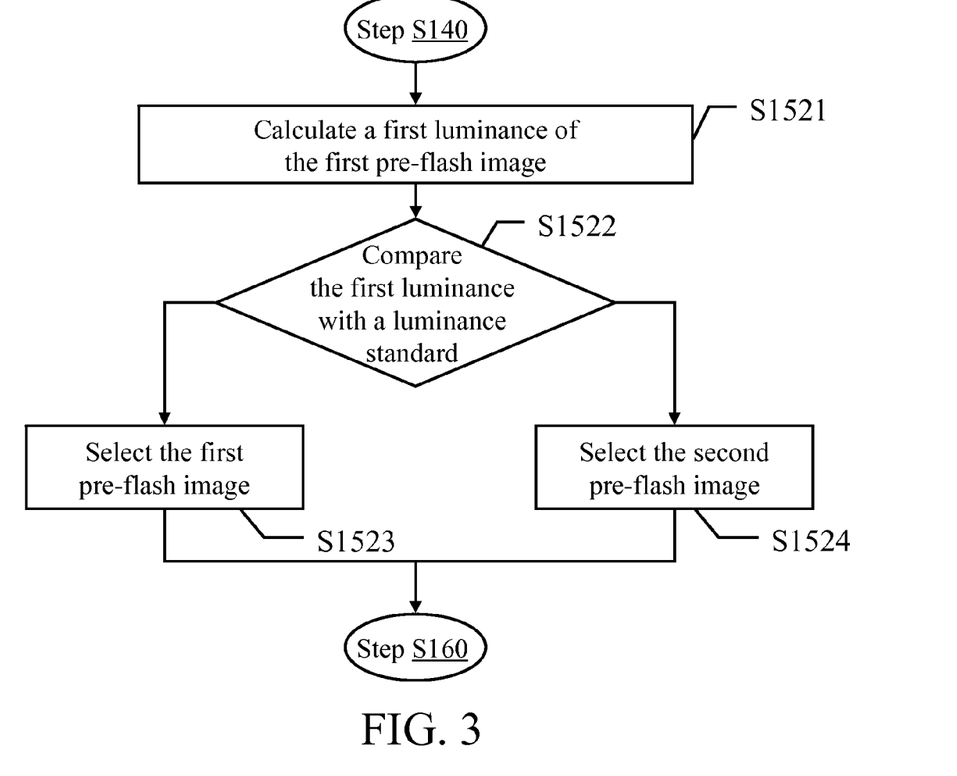
FIG. 3 is another flow chart of selecting one of the first pre-flash image and the second pre-flash image according to an embodiment of the present invention.

FIG. 3 is another flow chart of selecting one of the first pre-flash image and the second pre-flash image according to an embodiment of the present invention. Referring to FIG. 3, Step S150 may include the following implementation steps.

First, a first luminance value of the first pre-flash image is calculated (Step S1521). Then, the first luminance value is compared with a luminance standard to get a comparison result (Step S1522), so as to select the first pre-flash image or the second pre-flash image according to the got comparison result, thereby evaluating the flash intensity of the main-flash light. Herein, the first luminance value may be an average of luminance values of the first pre-flash image.

The digital image capture apparatus may preset a luminance standard, so as to be compared with the first luminance value when shooting the object. Herein, the luminance standard may be preset as a value representing a luminance of an overexposure image or a luminance of an insufficient-exposure image, or preset in a range representing a luminance of a normal-exposure image (i.e., a luminance range that is smaller than the luminance value of the overexposure image and greater than the luminance value of the insufficient-exposure image).

If the luminance value of the overexposure image is set as the luminance standard, when the first luminance value is greater than the luminance standard, the second pre-flash image is selected to be the determined pre-flash image (Step S1524), which serves as a reference for evaluating the flash intensity of the main-flash light. When the first luminance value is equal to the luminance standard, the first pre-flash image is selected to be the determined pre-flash image (Step S1523), which serves as a reference for evaluating the flash intensity of the main-flash light. When the first luminance value is smaller than the luminance standard, the first pre-flash image is selected to be the determined pre-flash image (Step S1523), which serves as a reference for evaluating the flash intensity of the main-flash light.

Furthermore, if the luminance value of the insufficient-exposure image is set as the luminance standard, when the first luminance value is greater than the luminance standard, the first pre-flash image is selected to be the determined pre-flash image (Step S1523), which serves as a reference for evaluating the flash intensity of the main-flash light. When the first luminance value is equal to the luminance standard, the first pre-flash image is selected to be the determined pre-flash image (Step S1523), which serves as a reference for evaluating the flash intensity of the main-flash light. When the first luminance value is smaller than the luminance standard, the first pre-flash image is selected to be the determined pre-flash image (Step S1523), which serves as a reference for evaluating the flash intensity of the main-flash light. That is, the determined pre-flash image is the first pre-flash image whenever the comparison result between the first luminance and the luminance standard.

Moreover, if a certain luminance in a range of smaller than the luminance value of the overexposure image and greater than the luminance value of the insufficient-exposure image is set as the luminance standard, when the first luminance value is out of and greater than the luminance standard, the second pre-flash image is selected to be the determined pre-flash image (Step S1524), which serves as a reference for evaluating the flash intensity of the main-flash light. When the first luminance value is equal to the luminance standard, the first pre-flash image is selected to be the determined pre-flash image (Step S1523), which serves as a reference for evaluating the flash intensity of the main-flash light. When the first luminance value is out of and smaller than the luminance standard, the first pre-flash image is selected to be the determined pre-flash image (Step S1523), which serves as a reference for evaluating the flash intensity of the main-flash light.

Figure 4:
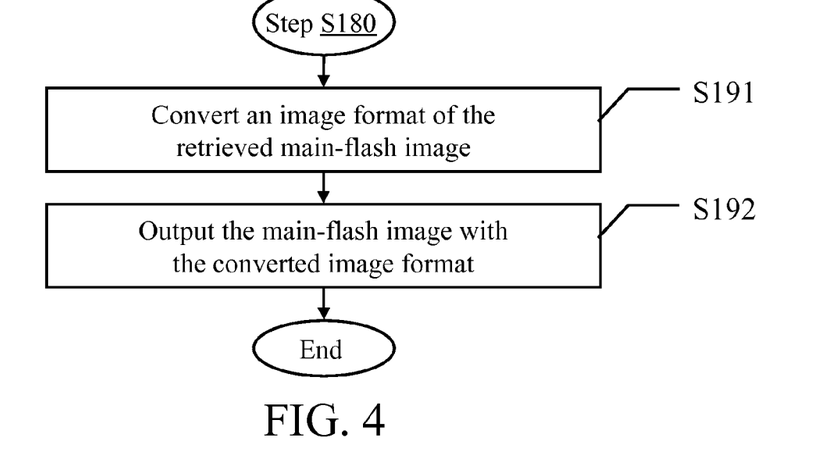
FIG. 4 is a flow chart of outputting a retrieved main-flash image according to an embodiment of the present invention.

Finally, when the main-flash image is output, the main-flash image is converted through an image format conversion into an image format that can be output. FIG. 4 is a flow chart of outputting a retrieved main-flash image according to an embodiment of the present invention.

First, an image format of the retrieved main-flash image is converted (Step S191), and the main-flash image with the converted image format is output (Step S192). For example, after the digital image capture apparatus retrieves the main-flash image, a raw data of the main-flash image is converted through calculation into an image format that can be output, such as a joint photographic experts group (JPG) format.

Moreover, a difference between the pre-flash image and an image under no flash may also be utilized to determine the image used for evaluating the main-flash light.

Figure 5:
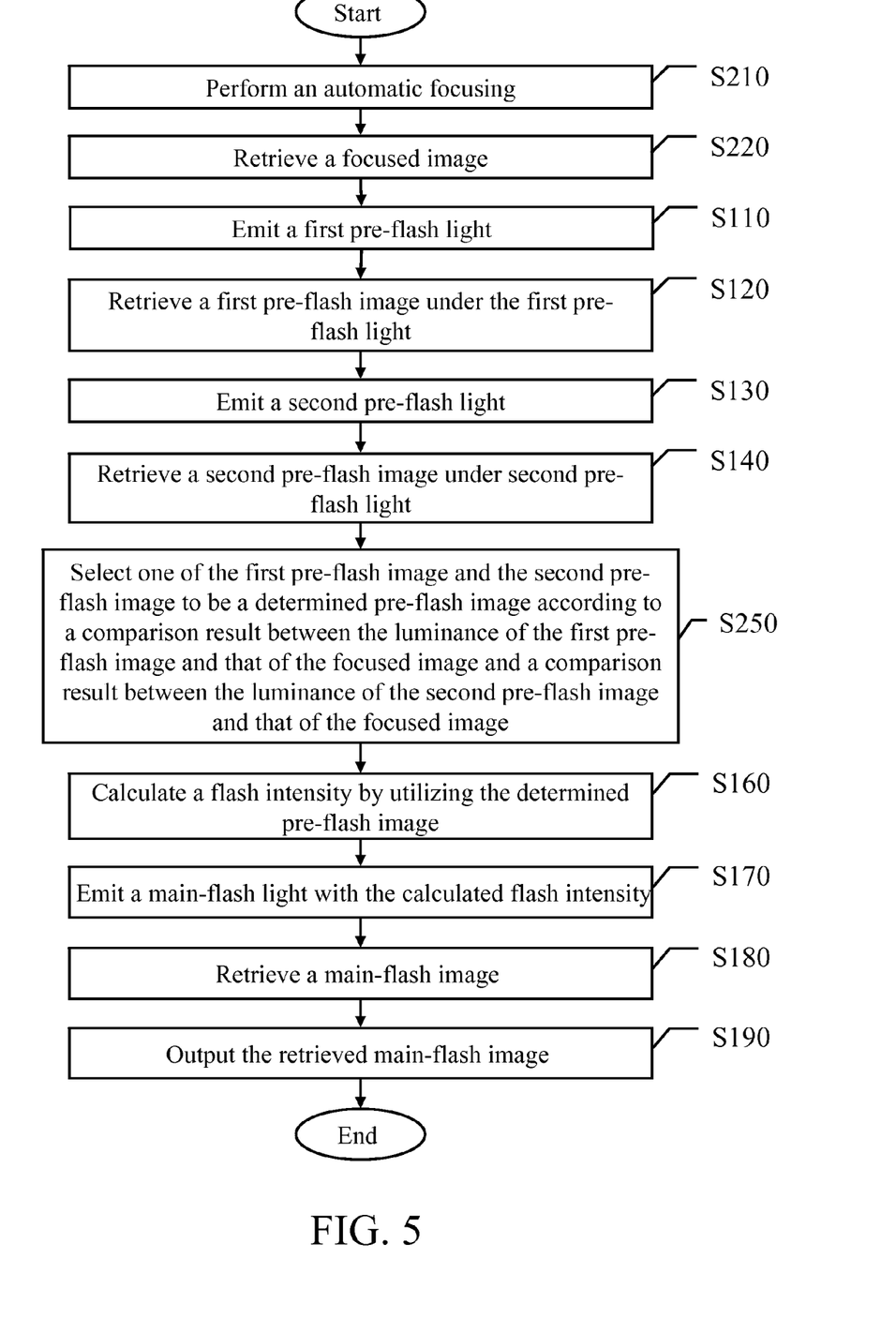
FIG. 5 is a schematic view of an adjusting method of flash intensity according to another embodiment of the present invention.

FIG. 5 is a schematic view of an adjusting method of flash intensity according to another embodiment of the present invention.

When the flash lamp of the digital image capture apparatus is in an ON state, the digital image capture apparatus performs an automatic focusing before the image capture apparatus shoots an object (Step S210). After the automatic focusing is accomplished, a focused image corresponding to the shot object is retrieved (Step S220). Then, the flash lamp of the digital image capture apparatus emits a first pre-flash light (Step S110), and under the first pre-flash light, a first pre-flash image corresponding to the shot object is retrieved (Step S120). Then, the flash lamp of the digital image capture apparatus emits a second pre-flash light (Step S130), and under the second pre-flash light, a second pre-flash image corresponding to the shot object is retrieved (Step S140).

Then, after the focused image, the first pre-flash image, and the second pre-flash image are retrieved, the digital image capture apparatus selects one of the first pre-flash image and the second pre-flash image according to a comparison result between the luminance of the first pre-flash image and that of the focused image and a comparison result between the luminance of the second pre-flash image and that of the focused image (Step S250), and calculates a flash intensity by utilizing the determined pre-flash image (i.e., the first pre-flash image or the second pre-flash image) (Step S160). Then, the flash lamp emits a main-flash light with the calculated flash intensity (Step S170), so as to shoot the object. At this time, the digital image capture apparatus retrieves a main-flash image corresponding to the shot object under the main-flash light (Step S180). Finally, the digital image capture apparatus displays the retrieved main-flash image on the display thereof (Step S190).

The flash intensity of the second pre-flash light is different from that of the first pre-flash light. Herein, the flash intensity of the first pre-flash light may be set to be greater than that of the second pre-flash light, and however, the flash intensity of the first pre-flash light may also be set to be smaller than that of the second pre-flash light.

Herein, it is described that the focused image and the two pre-flash images are retrieved sequentially. However, actually, the two pre-flash images may be retrieved first and then the focused image is retrieved. Alternatively, one of the two pre-flash images is retrieved first; next, the focused image is retrieved, and then the other one of the two pre-flash images is retrieved.

Figure 6:
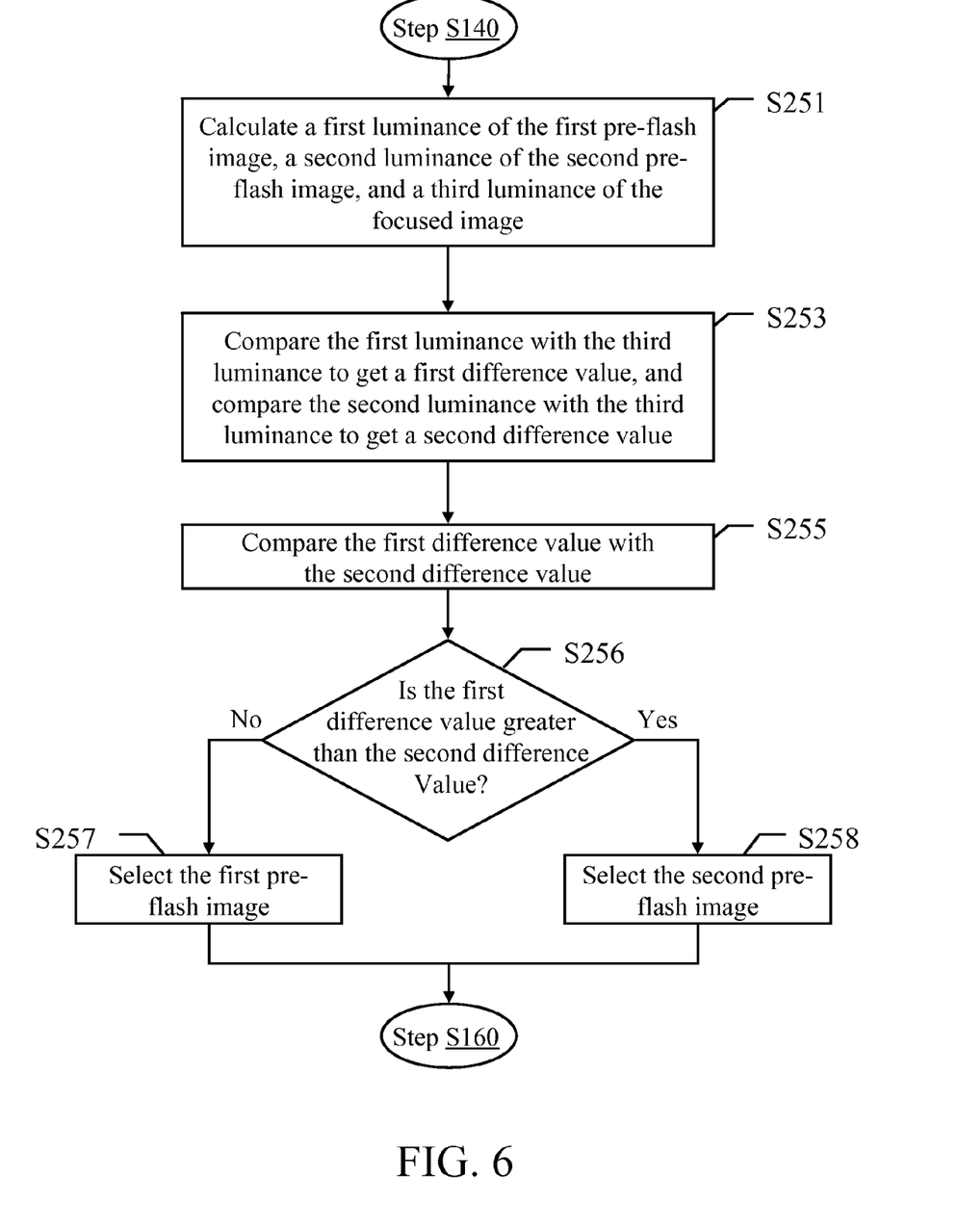
FIG. 6 is a flow chart of selecting one of a first pre-flash image and a second pre-flash image according to another embodiment of the present invention.

FIG. 6 is a flow chart of selecting one of a first pre-flash image and a second pre-flash image according to another embodiment of the present invention. Referring to FIG. 6, Step S250 may include the following implementation steps.

The first luminance value of the first pre-flash image, the second luminance value of the second pre-flash image, and the third luminance value of the focused image are calculated (Step S251). Then, the first luminance value is compared with the third luminance value to get a first difference value, and the second luminance value is compared with the third luminance value to get a second difference value (Step S253). The first difference value is then compared with the second difference value to get a comparison result (Step S255), so as to select one of the first pre-flash image and the second pre-flash image according to the got comparison result between the first difference value and the second difference value, thereby evaluating the flash intensity of the main-flash light.

When the first difference value is equal to or smaller than the second difference value (Step S256), the first pre-flash image is selected to be the determined pre-flash image (Step S257), which serves as a reference for evaluating the flash intensity of the main-flash light. On the contrary, when the first difference value is greater than the second difference value (Step S256), the second pre-flash image is selected to be the determined pre-flash image (Step S258), which serves as a reference for evaluating the flash intensity of the main-flash light.

Herein, the first luminance value may be an average of luminance values of the first pre-flash image. The second luminance value may be an average of luminance values of the second pre-flash image. The third luminance value may be an average of luminance values of the focused image.

Herein, when the main-flash image is output, the main-flash image may be first converted through an image format conversion into an image format that can be output, as shown in FIG. 4.

Referring to FIG. 4, the image format of the retrieved main-flash image is converted first (Step S191), and then the main-flash image with the converted image format is output (Step S192).

Generally, the selection of shoot modes may be distinguished according to a distance between the digital image capture apparatus and the shot object. The normal mode is selected when the distance between the digital image capture apparatus and the shot object is more than 0.5 meters, and the macro mode is selected when the distance between the digital image capture apparatus and the shot object is less than 0.5 meters.

Table 1 shows experimental data about the luminance values of the main-flash images of the shot objects for five different shot objects shot at five shooting distances by a digital image capture apparatus in the prior art. As seen from Table 1 that, when the shooting distance is less than 0.4 meters, an over exposure occurs to the luminance of the shot main-flash images of the five shot objects.

TABLE 1

| Object | Distance | | | | |
| --- | --- | --- | --- | --- | --- |
| | 0.3 meters | 0.4 meters | 0.5 meters | 1 meter | 2 meters |
| 1 | 206.578 | 165.291 | 147.861 | 137.341 | 142.126 |
| 2 | 217.969 | 164.509 | 151.546 | 139.826 | 144.022 |
| 3 | 214.303 | 169.580 | 151.584 | 145.517 | 138.846 |

TABLE 1-continued

| | Distance | | | | |
|---|---|---|---|---|---|
| Object | 0.3 meters | 0.4 meters | 0.5 meters | 1 meter | 2 meters |
| 4 | 203.535 | 170.029 | 146.651 | 145.383 | 146.577 |
| 5 | 222.710 | 166.265 | 150.367 | 137.719 | 146.491 |

Table 2 shows experimental data about the luminance values of five different objects shot at five shooting distances by a digital image capture apparatus applying the adjusting method of flash intensity according to the present invention. As seen from Table 2 that, at the five shooting distances, the luminance values of the main-flash images for the five shot objects are all in a normal range.

TABLE 2

| | Distance | | | | |
|---|---|---|---|---|---|
| Object | 0.3 meters | 0.4 meters | 0.5 meters | 1 meter | 2 meters |
| 1 | 142.237 | 145.466 | 141.330 | 130.736 | 149.884 |
| 2 | 159.117 | 147.160 | 146.141 | 138.174 | 140.016 |
| 3 | 150.274 | 145.962 | 150.085 | 136.512 | 145.991 |
| 4 | 151.461 | 143.950 | 149.262 | 140.155 | 142.673 |
| 5 | 145.287 | 141.819 | 136.358 | 137.919 | 137.947 |

Thus, as known from the experimental data shown in Table 1 and Table 2 that, the adjusting method of flash intensity according to the present invention can be used to eliminate the problem of the over exposure or insufficient exposure of the main-flash image.

When being applied in a digital image capture apparatus, the adjusting method of flash intensity provided by the present invention enables the digital image capture apparatus to produce a main-flash light with a proper flash intensity in any shoot mode, thereby reducing the luminance error in the digital image caused by a mistake made by the user when performing the settings.

What is claimed is:

1. An adjusting method of flash intensity, applied in an image capture apparatus with a flash lamp, the adjusting method comprising:
    emitting a first pre-flash light by the flash lamp when the image capture apparatus photographs an object;
    retrieving a first pre-flash image corresponding the object under the first pre-flash light;
    emitting a second pre-flash light by the flash lamp when the image capture apparatus shoots the object, wherein flash intensity of the second pre-flash light is different from flash intensity of the first pre-flash light;
    retrieving a second pre-flash image corresponding the object under the second pre-flash light;
    obtaining a plurality of pixel values of the first pre-flash image;
    obtaining a plurality of pixel values of the second pre-flash image;
    comparing the plurality of pixel values of the first pre-flash image with a preset threshold value respectively, and accumulating a first number, wherein the first number is a number of pixel values that are greater than the preset threshold value among the plurality of pixel values of the first pre-flash image;
    comparing the plurality of pixel values of the second pre-flash image with the reset threshold value respectively, and accumulating a second number, wherein the second number is a number of pixel values that are greater than the preset threshold value among the plurality of pixel values of the second pre-flash image;
    comparing the first number with the second number to obtain a comparison result; and
    selecting one of the first pre-flash image and the second pre-flash image to be a determined pre-flash image according to the obtained comparison result;
    calculating flash intensity of a main-flash light by utilizing the determined pre-flash image;
    emitting the main-flash light with the calculated flash intensity by the flash lamp;
    retrieving a main-flash image corresponding the object under the main-flash light; and
    outputting the retrieved main-flash image.

2. The adjusting method of flash intensity according to claim 1, wherein the step of comparing the first number with the second number comprises: selecting the greater number from the first number and the second number, so as to take a pre-flash image corresponding to the greater number of the first pre-flash image and the second pre-flash image as the determined pre-flash image.

3. The adjusting method of flash intensity according to claim 2, wherein when the flash intensity of the first pre-flash light is greater than the flash intensity of the second pre-flash light and the first number is equal to the second number, the first pre-flash image is selected to be the determined pre-flash image.

4. The adjusting method of flash intensity according to claim 1, wherein when the flash intensity of the first pre-flash light is greater than the flash intensity of the second pre-flash light, the step of selecting one of the first pre-flash image and the second pre-flash image to be a determined pre-flash image comprises:
    averaging a plurality of luminance values of the first pre-flash image to get a first luminance value of the first pre-flash image;
    comparing the first luminance value with a luminance standard to get a comparison result; and
    selecting one of the first pre-flash image and the second pre-flash image as the determined pre-flash image according to the comparison result.

5. The adjusting method of flash intensity according to claim 4, wherein the luminance standard includes a luminance value of an overexposure image.

6. The adjusting method of flash intensity according to claim 5, wherein when the first luminance is greater than the luminance value of the overexposure image, the second pre-flash image is selected to be the determined pre-flash image.

7. The adjusting method of flash intensity according to claim 5, wherein when the first luminance is equal to or smaller than the luminance value of the overexposure image, the first pre-flash image is selected to be the determined pre-flash image.

8. The adjusting method of flash intensity according to claim 4, wherein the luminance standard includes a luminance value of an insufficient-exposure image.

9. The adjusting method of flash intensity according to claim 4, wherein the luminance standard is a luminance in a range of smaller than a luminance value of an overexposure image and greater than a luminance value of an insufficient-exposure image.

10. The adjusting method of flash intensity according to claim 1, wherein the step of outputting the retrieved main-flash image comprises:
    converting an image format of the retrieved main-flash image; and outputting the main-flash image with the converted image format.

11. An adjusting method of flash intensity, applied in an image capture apparatus with a flash lamp, the adjusting method comprising:

performing an automatic focusing before the image capture apparatus shoots an object;

retrieving a focused image corresponding to the object after the automatic focusing is accomplished;

emitting a first pre-flash light by the flash lamp;

retrieving a first pre-flash image corresponding to the object under the first pre-flash light;

emitting a second pre-flash light by the flash lamp, wherein a flash intensity of the second pre-flash light is different from a flash intensity of the first pre-flash light;

retrieving a second pre-flash image corresponding to the object under the second pre-flash light;

calculating a first luminance value of the first pre-flash image;

calculating a second luminance value of the second pre-flash image;

calculating a third luminance value of the focused image;

comparing the first luminance value with the third luminance value to get a first difference value;

comparing the second luminance value with the third luminance value to get a second difference value;

comparing the first difference value with the second difference value to get a comparison result;

selecting one of the first pre-flash image and the second pre-flash image to be a determined pre-flash image according to the comparison result;

calculating a flash intensity by utilizing the determined pre-flash image;

emitting a main-flash light with the calculated flash intensity by the flash lamp;

retrieving a main-flash image corresponding to the object under the main-flash light; and outputting the retrieved main-flash image.

12. The adjusting method of flash intensity according to claim 11, wherein the step of calculating the first luminance value comprising: averaging a plurality of luminance values of the first pre-flash image to get the first luminance value.

13. The adjusting method of flash intensity according to claim 11, wherein the step of calculating the second luminance value comprising: averaging a plurality of luminance values of the second pre-flash image to get the second luminance value.

14. The adjusting method of flash intensity according to claim 11, wherein the step of calculating the third luminance value comprising: averaging a plurality of luminance values of the focused image to get the third luminance value.

15. The adjusting method of flash intensity according to claim 11, wherein when the first difference value is greater than the second difference value, the second pre-flash image is selected to be the determined pre-flash image; and wherein when the first difference value is equal to or smaller than the second difference value, the first pre-flash image is selected to be the determined pre-flash image.

16. The adjusting method of flash intensity according to claim 11, wherein the step of outputting the retrieved main-flash image comprises:

converting an image format of the retrieved main-flash image; and outputting the main-flash image with the converted image format.

* * * * *